United States Patent
Yoo

(10) Patent No.: US 7,512,480 B1
(45) Date of Patent: Mar. 31, 2009

(54) METHOD AND APPARATUS FOR CONTROLLING ELECTRONIC VARIABLE VALVE APPARATUS OF INTERNAL COMBUSTION ENGINE

(75) Inventor: Hakmo Yoo, Suwon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 11/965,600

(22) Filed: Dec. 27, 2007

(30) Foreign Application Priority Data

Nov. 27, 2007 (KR) .................. 10-2007-0121456

(51) Int. Cl.
*F02D 45/00* (2006.01)
*G06F 19/00* (2006.01)

(52) U.S. Cl. .............. 701/103; 123/90.17; 701/110

(58) Field of Classification Search .......... 701/103, 701/102, 110, 115; 123/90.17
See application file for complete search history.

(56) References Cited

U.S. PATENT DOCUMENTS 6,267,101 B1 * 7/2001 Kim ........................ 701/110

FOREIGN PATENT DOCUMENTS

JP 2002-276310 9/2002
JP 2007-77945 A * 3/2007

* cited by examiner

*Primary Examiner*—Hieu T Vo
(74) *Attorney, Agent, or Firm*—Morgan, Lewis & Bockius LLP

(57) ABSTRACT

An electronic variable valve apparatus may be stably controlled regardless of variations of engine condition with minimized usage of map tables by employing a sliding surface calculation for controlling the electronic variable valve apparatus in order to achieve a target cam angle.

6 Claims, 6 Drawing Sheets

METHOD AND APPARATUS FOR CONTROLLING ELECTRONIC VARIABLE VALVE APPARATUS OF INTERNAL COMBUSTION ENGINE

CROSS-REFERENCE TO RELATED APPLICATION

This application claims priority to and the benefit of Korean Patent Application No. 10-2007-0121456 filed in the Korean Intellectual Property Office on Nov. 27, 2007, the entire contents of which are incorporated herein by reference.

BACKGROUND OF THE INVENTION (a) Field of the Invention

The present invention relates to an internal combustion engine. More particularly, the present invention relates to a method and apparatus for controlling an electronic variable valve apparatus of an internal combustion engine.

(b) Description of the Related Art

Performance of an internal combustion engine, especially a gasoline engine, substantially depends on how efficiently an air can be drawn into a combustion chamber.

For better intake efficiency, a variable valve apparatus for varying valve timing is employed such that optimal amount of air can be drawn into the combustion chamber for various engine speeds.

A hydraulic variable valve apparatus that is typically employed has a drawback in that, when the engine speed is low or engine oil is at a low temperature, a torque for operating the apparatus is increased. In addition, such a hydraulic variable valve apparatus does not usually provide sufficient variation of cam angle.

In order to solve such drawbacks, an electronic variable valve apparatus is widely studied as an alternative for such a hydraulic variable valve apparatus.

The electronic variable valve apparatus shows many merits. For example, it shows higher response speed that a conventional hydraulic variable valve apparatus. An oil pump of an engine may be downsized since the electronic variable valve apparatus does not require a hydraulic pressure. The electronic variable valve apparatus can be properly operated even if the engine speed is low or the engine oil is at a low temperature, which means that a load for starting the engine may be reduced. Furthermore, an exhaust gas may be reduced when the engine is at a low temperature.

In addition the electronic variable valve apparatus may be operated at a wider range of an angle, such that the merits of varying the valve timing may be maximized.

The electronic variable valve apparatus are typically driven by an electronic clutch or a motor.

The scheme employing the electronic clutch costs less but it is harder to control. The scheme employing the motor cost more but it is easier to control.

An example of the electronic variable valve apparatus can be found in Japanese Patent Laid-Open Publication No. 2002-276310.

In order to control an angle of a camshaft according to the conventional scheme, an engine control unit calculates an angular difference $\Delta\theta$ between a reference angle depending on an engine state and a current angle detected by a cam angle sensor, and determines whether the angular difference $\Delta\theta$ is above a predetermined error value.

When the angular difference $\Delta\theta$ is less than the predetermined error value, the current control is maintained, and a clutch release coil and a brake control coil is not applied with a current.

When the angular difference $\Delta\theta$ is above the predetermined error value, it is determined whether the angular difference $\Delta\theta$ is positive or negative. If the angular difference $\Delta\theta$ is positive, a current is applied to the clutch release coil and the brake control coil so as to perform an advance control. If the angular difference $\Delta\theta$ is negative, a current is applied to the clutch release coil and the brake control coil so as to perform a retardation control.

According to the above scheme where a current to be applied to the clutch release coil and the brake control coil is on/off controlled in order to control an angle of a camshaft, calibration maps should be provided depending on control responsiveness, angular error, and engine states.

According to such a scheme, huge amount of experimentation is required in order to prepare sufficiently precise calibration maps, which causes the cost for newly designing a vehicle to increase very high.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for controlling an electronic variable valve apparatus having advantages of a stable control with minimized usage of map tables by employing a sliding surface calculation.

An exemplary embodiment of the present invention provides an apparatus for controlling an electronic variable valve apparatus that includes: a cam angle sensor that detects a cam angle; a crank angle sensor that detects a crank angle; and a controller that determines a target cam angle and controls the electronic variable valve apparatus in order to achieve the target cam angle, based on a sliding surface calculation.

The controller may include: a synchronization unit that obtains a current cam angle by synchronizing a cam angle signal and a crank angle signal; a comparator that obtains a deviation between the target cam angle and the current cam angle; a control unit that outputs a control signal for adjusting the cam angle for advance and retardation based on the deviation received from the comparator; and an actuation unit that controls the electronic variable valve apparatus according to the control signal from the control unit.

An exemplary embodiment of the present invention provides a method of controlling a clutch type electronic variable valve apparatus that includes: setting a reference cam angle depending on an engine operation state; detecting a current cam angle, an engine speed, and an engine oil temperature; calculating a sliding surface; calculating a deviation of the current cam angle from the reference cam angle; determining whether the calculated deviation is above a reference value; calculating an estimated current for maintaining the sliding surface when the calculated deviation is above the reference value; calculating a application current using the calculated sliding surface and the estimated current; and adjusting the current cam angle by operating the electronic variable valve apparatus by a driving duty ratio that is converted from the application current.

According to an exemplary embodiment of the present invention, a clutch type electronic variable valve apparatus may be stably controlled regardless of variations of engine condition such as an engine oil temperature.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
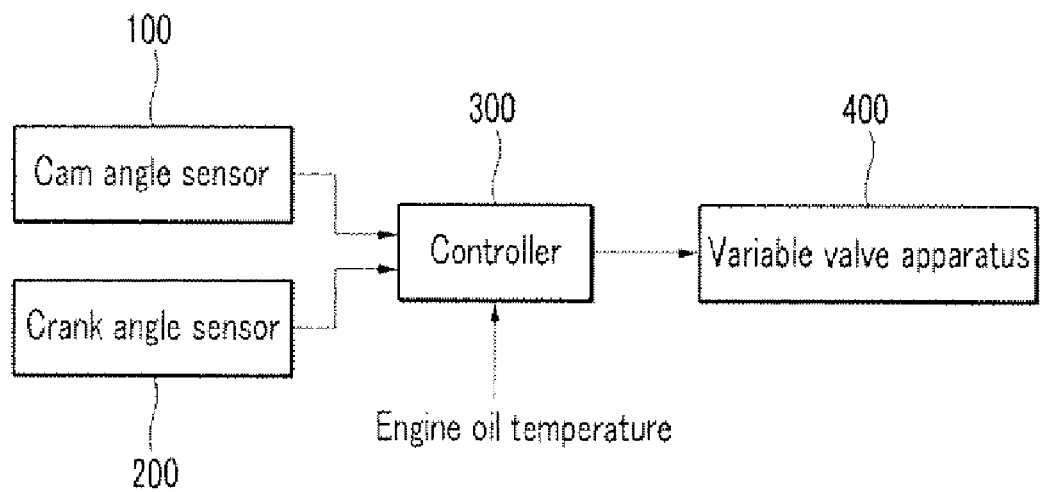
FIG. 1 is a block diagram for an apparatus for controlling an electronic variable valve apparatus of an internal combustion engine according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

<Description of Reference Numerals Indicating Primary Elements in the Drawings>

100: cam angle sensor 200: crank angle sensor

300: controller 400: electronic variable valve apparatus

DETAILED DESCRIPTION OF THE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

FIG. 1 is a block diagram for an apparatus for controlling an electronic variable valve apparatus of an internal combustion engine according to an exemplary embodiment of the present invention.

As shown in FIG. 1, an apparatus for controlling an electronic variable valve apparatus of an internal combustion engine according to an exemplary embodiment of the present invention includes a cam angle sensor 100, a crank angle sensor 200, a controller 300, and an electronic variable valve apparatus 400.

The cam angle sensor 100 detects an angular position of a camshaft (hereinafter called a cam angle) of an internal combustion engine, and provides information for the detected angular position of the camshaft to the controller 300.

The crank angle sensor 200 detects an angular position of a crankshaft (hereinafter called a crank angle) of the internal combustion engine, and provides information for the detected crank angle to the controller 300.

Based on the cam angle received from the cam angle sensor 100 and the crank angle received from the crank angle sensor 200, the controller 300 determines a target cam angle, and controls the electronic variable valve apparatus 400 by a method involving a sliding surface calculation such that the cam angle may become the target cam angle.

The electronic variable valve apparatus 400 receives a control signal from the controller 300, and controls the cam angle of the camshaft according to the control signal received from the controller 300.

Figure 2:
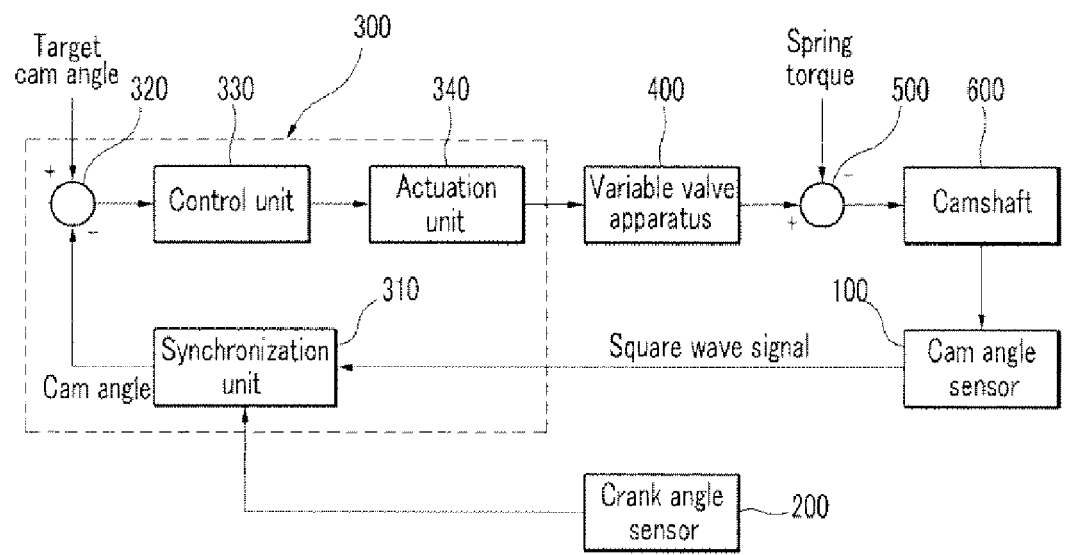
FIG. 2 is a block diagram that shows a detailed configuration of an apparatus for controlling an electronic variable valve apparatus of an internal combustion engine according to an exemplary embodiment of the present invention.

FIG. 2 is a block diagram that shows a detailed configuration of an apparatus for controlling an electronic variable valve apparatus of an internal combustion engine according to an exemplary embodiment of the present invention.

As shown in FIG. 2, the controller 300 includes a synchronization unit 310, a comparator 320, a control unit 330, and an actuation unit 340.

The synchronization unit 310 obtains a current cam angle by synchronizing a square wave signal for the cam angle received from the cam angle sensor 100 and a square wave signal for the crank angle received from the crank angle sensor 200.

The comparator 320 compares the current cam angle received from the synchronization unit 310 and a target cam angle depending on a driving condition, and outputs the comparison result.

The control unit 330 receives the comparison result form the comparator 320, and outputs a control signal for adjusting the cam angle of the camshaft 600 for advance and retardation.

The actuation unit 340 controls an operation of the electronic variable valve apparatus 400 of an electronic clutch type according to the control signal received from the control unit 330 such that a cam angle of the camshaft 600 may become a target angle depending on the current engine state.

Spring torque may be regarded as disturbance element for the control system and thus element 500 is added to simulate the spring torque in this model.

Figure 3:
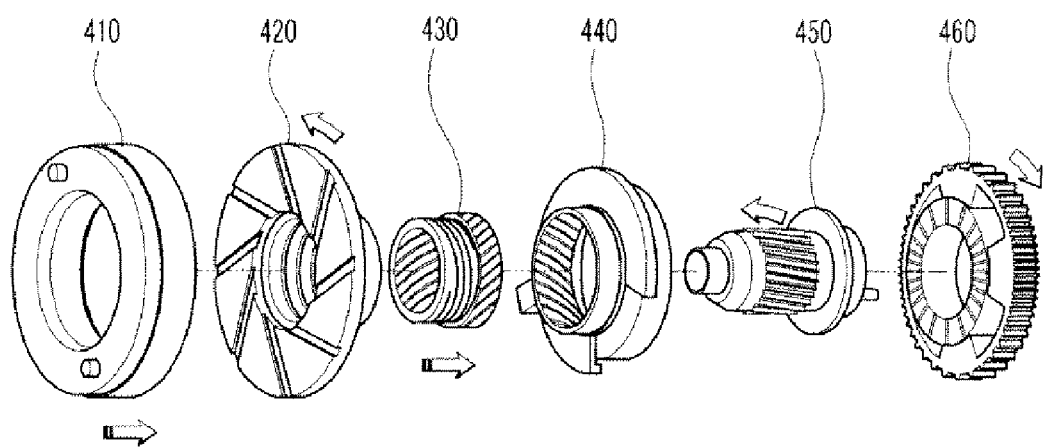
FIG. 3 is an exploded view of an electronic variable valve apparatus of an internal combustion engine according to an exemplary embodiment of the present invention.

FIG. 3 is an exploded view of an electronic variable valve apparatus of an internal combustion engine according to an exemplary embodiment of the present invention.

As shown in FIG. 3, the electronic variable valve apparatus 400 includes an electronic clutch 410, a damper disk 420, an advance plate 430, an exterior shaft 440, an interior shaft 450, and a chain sprocket 460.

The electronic clutch 410 is mounted at a chain cover of an engine, and may be magnetized so as to make a contact with the damper disk 420 and generate a frictional force when a control signal is applied.

The interior shaft 450 is mounted at an end of the camshaft. The advance plate 430 is engaged with exterior circumference of the interior shaft 450 by helical gears. The exterior shaft 440 is engaged with an exterior circumference of the advance plate 430 by helical gears. Thus, a spline shaft unit is formed.

A chain sprocket 460 is placed behind the interior shaft 450 and the exterior shaft 440 of the spline shaft unit on the camshaft, and enables power delivery from a sprocket of a crankshaft by a timing chain.

The damper disk 420 is placed in front of the interior shaft 450 of the spline shaft unit. A rear side of the damper disk 420 is supported by the advance plate 430, and a torsion coil spring is placed between the rear side of the damper disk 420 and the exterior shaft 440. A friction surface is formed at a front side of the damper disk 420 such that a frictional force is generated by contacting the electronic clutch 410.

Such an electronic variable valve apparatus 400 may be expressed as a second order differential equation of the following Equation 1.

$$Jd \times \frac{d\theta^2}{d^2t} + Dd \times \frac{d\theta}{dt} + (Kn \times \theta + T) = \mu \times rd \times kl \times I \quad \text{(Equation 1)}$$

Here, T denotes a spring torque, Jd denotes a momentum inertia, θ denotes a cam angle, Dd denotes a viscosity coefficient, Kn denotes a spring constant, μ denotes a frictional coefficient of the clutch, rd denotes an effective radius of the clutch, Kl denotes an attractive force of the clutch, and I denotes an applied current.

The above Equation 1 may be changed to the following Equation 2.

$$\frac{d\theta^2}{d^2t} + a\frac{d\theta}{dt} + b \times \theta + c = d \times I, \text{ where,} \quad \text{(Equation 2)}$$

$$a = \frac{Dd}{Jd}, b = \frac{Kn}{Jd}, c = \frac{T}{Jd}, d = \frac{\mu \times rd \times kl}{Jd}.$$

Next, the first step to derive the controller is to decide the expression of error. Therefore, in the Equation 2, an estimated error $\tilde{\theta}$ is defined as $\tilde{\theta} = \theta - \theta d$. The next step is to define a sliding surface S and thereby sliding surface S is defined as $S = (\tilde{\theta}' + \lambda \tilde{\theta})$. S' can be expressed as the following Equation 3.

$$S' = dI - a\theta' - b\theta - c + 2\theta'' \quad \text{(Equation 3)}$$

From the Equation 3, an estimated current Î for maintaining the sliding surface may be obtained as the following Equation 4.

$$\hat{I} = \frac{\theta''d + a\theta' - \lambda\tilde{\theta} + b\theta + c}{d} \quad \text{(Equation 4)}$$

From the Equation 4, an application current Ieq for a non-linear control is obtained as the following Equation 5.

$$Ieq = \hat{I} + K \, sgn(S) \quad \text{(Equation 5)}$$

Here, K is a control constant.

An operation of adjusting a cam angle according to an engine state is described hereinafter.

When the engine is running, the chain sprocket 460 is driven by the engine through a timing chain, and accordingly the camshaft connected thereto rotates.

The spline shaft unit having the advance plate 430, the exterior shaft 440, and the interior shaft 450 that are engaged with each other by helical gears also rotates with the rotation of the chain sprocket 460. In addition, the damper disk 420 placed in front of the interior shaft 450 also rotates in the same way.

At this time, the controller 300 receives a cam angle signal from the cam angle sensor 100 and a crank angle signal from the crank angle sensor 200, and determines a target cam angle according to a current engine state. Then, the controller 300 outputs a control signal for adjusting the cam angle to the electronic variable valve apparatus 400.

Then, the electronic clutch 410 in the electronic variable valve apparatus 400 is magnetized and moves to the damper disk 420 in the rotational axis so as to make a contact therewith, such that a frictional torque is generated by the friction surface of the damper disk 420.

Therefore, the damper disk 420 receives a force shown in an arrow.

Therefore, the interior shaft 450 engaged with the chain sprocket 460 varies an angle of the chain sprocket 460 that is connected with the camshaft.

Therefore, the cam angle is varied by the change of the angle of the chain sprocket 460.

While such an operation is performed, the synchronization unit 310 in the controller 300 obtains a current cam angle by comparing signals from the cam angle sensor 100 and the crank angle sensor 200.

The obtained current cam angle is compared with the target cam angle at the comparator 320, and the comparison result is provided to the control unit 330.

Depending on the comparison result, the control unit 330 varies a level of the current applied to the electronic clutch 410 of the electronic variable valve apparatus 400 through the actuation unit 340 until the current cam angle becomes the target cam angle.

Figure 4:
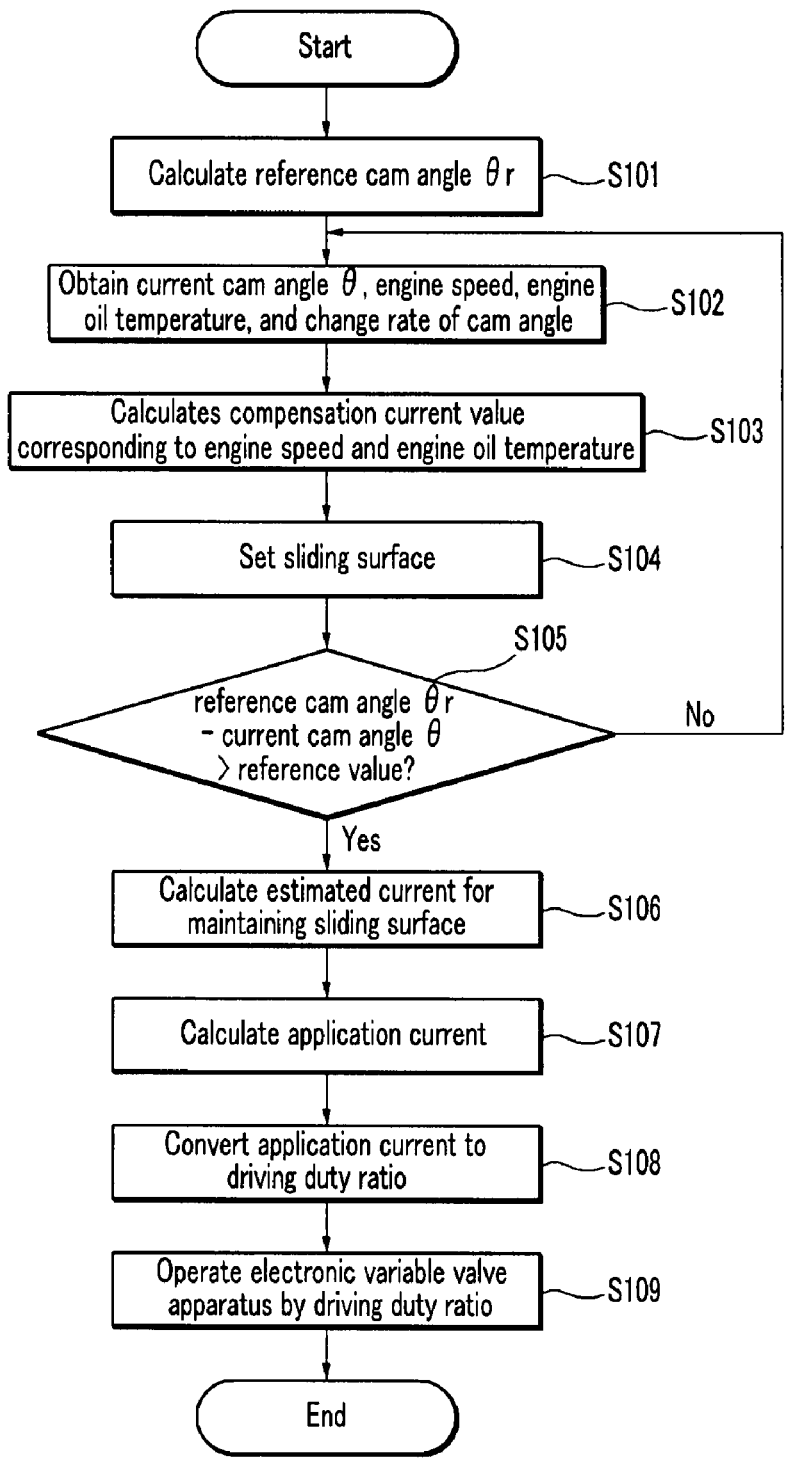
FIG. 4 is a flowchart for a method for controlling an electronic variable valve apparatus of an internal combustion engine according to an exemplary embodiment of the present invention.

FIG. 4 is a flowchart for a method for controlling an electronic variable valve apparatus of an internal combustion engine according to an exemplary embodiment of the present invention.

Firstly at step S101, the controller 300 calculates a reference cam angle θr depending on an engine operation state.

Then, at step S102, the controller 300 obtains a current cam angle θ and an engine speed based on signals from the cam angle sensor 100 and the crank angle sensor 200.

In addition, the controller 300 may obtain an oil temperature of engine oil, and calculates a change rate of the cam angle.

A control responsiveness of the clutch type electronic variable valve apparatus depends on the condition of the engine speed and engine oil temperature. Therefore, at step S103, the controller 300 calculates a compensation current value corresponding to the engine speed and engine oil temperature.

Subsequently at step S104, the controller 300 sets the sliding surface S with the current cam angle θ, by calculating the estimated error and its derivative.

Then, at step S105, the controller 300 calculates a deviation of the cam angle as a difference between the current cam angle θ and the reference cam angle θr, and determines whether the deviation is above a reference value, i.e. a minimal permissible deviation.

When the cam angle deviation is less than the reference value, the process returns to the step of s102. When the cam angle deviation is above the reference value, the controller calculates the estimated current Î for maintaining the sliding surface at step S106.

Then at step S107, the controller 300 calculates the application current Ieq by the Equation 5 using the calculated sliding surface S and the estimated current Î.

Then, the controller 300 converts the application current Ieq to a driving duty ratio at step S108, and operates the electronic variable valve apparatus 400 by outputting the duty ratio at step S109 such that the cam angle may become the target cam angle.

Figure 5:
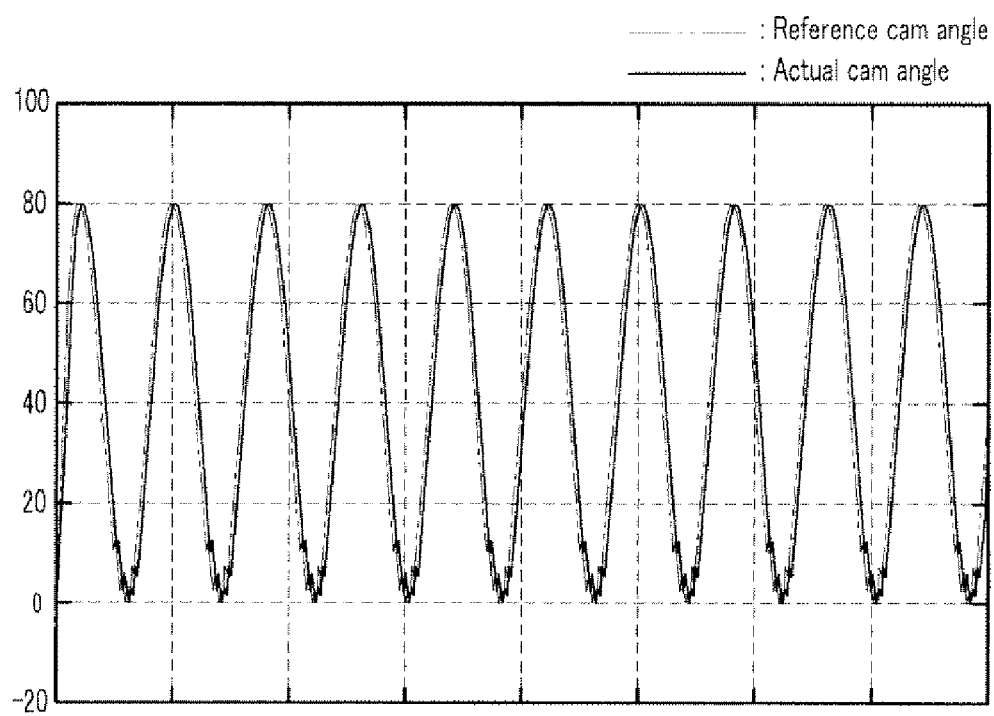
FIG. 5 and FIG. 6 show graphs obtained by applying the scheme of controlling an electronic variable valve apparatus according to an exemplary embodiment of the present invention in conditions of different engine oil temperatures.

FIG. 5 shows a graph obtained by applying the scheme of controlling an electronic variable valve apparatus according to an exemplary embodiment of the present invention in a condition that an engine oil temperature is 60° C. and the engine speed 2,000 RPM.

As shown in FIG. 5, it is experimentally confirmed that the cam angle precisely follows the reference cam angle.

Figure 6:
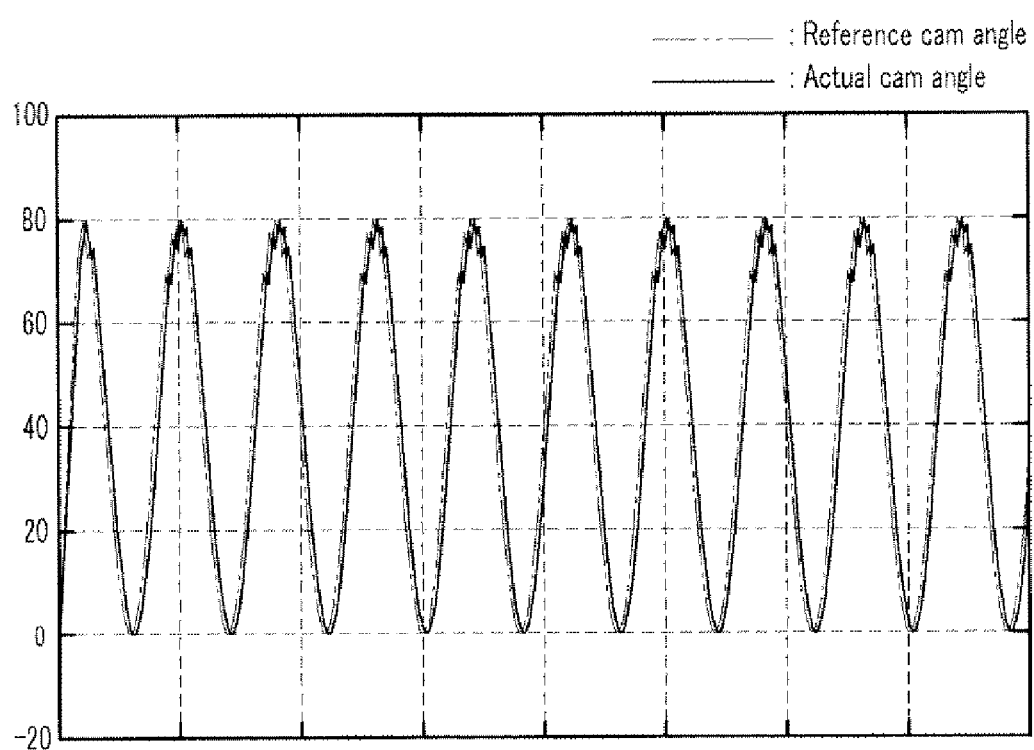

FIG. 6 shows a graph obtained by applying the scheme of controlling an electronic variable valve apparatus according to an exemplary embodiment of the present invention in a condition that an engine oil temperature is 0° C. and the engine speed 2,000 RPM.

As shown in FIG. 6, it is experimentally confirmed that the cam angle precisely follows the reference cam angle without tuning a specific parameter even if engine condition is changed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for controlling an electronic variable valve apparatus, comprising:
    a cam angle sensor that detects a cam angle;
    a crank angle sensor that detects a crank angle; and
    a controller that determines a target cam angle and controls the electronic variable valve apparatus in order to achieve the target cam angle, based on a sliding surface calculation.

2. The application of claim 1, wherein the controller comprises:
    a synchronization unit that obtains a current cam angle by synchronizing a cam angle signal and a crank angle signal;
    a comparator that obtains a deviation between the target cam angle and the current cam angle;
    a control unit that outputs a control signal for adjusting the cam angle for advance and retardation based on the deviation received from the comparator; and
    an actuation unit that controls the electronic variable valve apparatus according to the control signal from the control unit.

3. A method of controlling a clutch type electronic variable valve apparatus, comprising:
    setting a reference cam angle depending on an engine operation state;
    detecting a current cam angle, an engine speed, and an engine oil temperature;
    calculating a sliding surface;
    calculating a deviation of the current cam angle from the reference cam angle;
    determining whether the calculated deviation is above a reference value;
    calculating an estimated current for maintaining the sliding surface when the calculated deviation is above the reference value;
    calculating a application current using the calculated sliding surface and the estimated current;
    adjusting the current cam angle by operating the electronic variable valve apparatus by a driving duty ratio that is converted from the application current.

4. The method of claim 3, wherein a derivative of the sliding surface is obtained as $S'=dI-a\theta'-b\theta-c+\lambda\tilde{\theta}''$.

5. The method of claim 3, wherein the estimated current $\hat{I}$ for maintaining the sliding surface is obtained as $$\hat{I} = \frac{\theta''d + a\theta' - \lambda\tilde{\theta} + b\theta + c}{d}.$$

6. The method of claim 3, wherein the application current is obtained as $Ieq=\hat{I}+K\,sgn(S)$.

* * * * *